(12) United States Patent
Karweck et al.

(10) Patent No.: US 11,662,265 B2
(45) Date of Patent: May 30, 2023

(54) METHOD FOR PROVIDING CALIBRATED PRESSURE TRANSDUCERS

(71) Applicant: Endress+Hauser SE+Co. KG, Maulburg (DE)

(72) Inventors: Lars Karweck, Binzen (DE); Marc Andreas Schlachter, Wehr (DE); Christian Blansche, Rheinfelden (CH); Wolfgang Trunzer, Lörrach (DE); Andreas Ruhnau, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/956,597

(22) PCT Filed: Nov. 15, 2018

(86) PCT No.: PCT/EP2018/081288
§ 371 (c)(1),
(2) Date: Jun. 21, 2020

(87) PCT Pub. No.: WO2019/120776
PCT Pub. Date: Jun. 27, 2019

(65) Prior Publication Data
US 2021/0131900 A1    May 6, 2021

(30) Foreign Application Priority Data
Dec. 22, 2017   (DE) ...................... 10 2017 131 066.5

(51) Int. Cl.
*G01L 27/00* (2006.01)
(52) U.S. Cl.
CPC .................................. *G01L 27/002* (2013.01)
(58) Field of Classification Search
CPC ..................................................... G01L 27/002
See application file for complete search history.

(56) References Cited

U.S. PATENT DOCUMENTS

| 3,831,588 A * | 8/1974 | Rindner ................ G01L 27/005 604/118 |
| 4,827,772 A * | 5/1989 | Baker ..................... G01L 19/02 73/756 |

(Continued)

FOREIGN PATENT DOCUMENTS

| CN | 1410752 A | 4/2003 |
| CN | 101133309 A | 2/2008 |

(Continued)

OTHER PUBLICATIONS

Svinolupov, Yu.G., Vychkov, V.V., Pressure Control Devices with the Microprocessor Error Correction, Modern Technique and Technologies, 2003, 3 pp. (64-67).

*Primary Examiner* — Alexander Satanovsky
*Assistant Examiner* — Lyudmila Zaykova-Feldman
(74) *Attorney, Agent, or Firm* — Kelly J. Smith; Endress+Hauser (USA) Holding, Inc.

(57) ABSTRACT

A compensating of the sensor module occurs with the implementing of the transfer function in the measuring circuit of the sensor module. The transfer function generates sensor measured values as a function of primary signal. In a later sensor calibration, sensor measured values provided on the sensor module interface are registered as a function of supplied pressure values and stored in a calibration database. In a later electronics module calibration, measured value signals provided on the signaling interface are registered as a function of sensor measured values supplied by means of a calibration signal source and stored in a calibration database, wherein the supplied sensor measured values correspond to the sensor measured values of the sensor calibration. Finally, there follows the calibration protocol creation, in which the measured value signals ascertained in (Continued)

the electronics module calibration are associated with the pressure values supplied in the sensor calibration.

10 Claims, 2 Drawing Sheets

(56) References Cited

U.S. PATENT DOCUMENTS

| | | | |
|---|---|---|---|
| 5,531,128 A * | 7/1996 | Ryhanen | G01D 5/2417 73/862.623 |
| 9,417,146 B2 | 8/2016 | Dawson | |
| 2003/0079549 A1* | 5/2003 | Lokhorst | G01L 1/205 73/754 |
| 2004/0249592 A1* | 12/2004 | Koukol, Jr. | G01F 25/00 702/88 |
| 2006/0000265 A1* | 1/2006 | Parker | G01L 19/147 73/114.76 |
| 2006/0161364 A1* | 7/2006 | Wang | G01L 27/002 702/98 |
| 2006/0213249 A1* | 9/2006 | Uram | G01F 25/13 702/100 |
| 2007/0169557 A1* | 7/2007 | Harasyn | G01L 9/12 73/718 |
| 2008/0059084 A1* | 3/2008 | Wang | G01F 1/363 702/100 |
| 2008/0110236 A1* | 5/2008 | Hajishah | A61F 9/00745 73/1.64 |
| 2008/0186478 A1* | 8/2008 | Moroni | G01D 5/268 356/73 |
| 2008/0236289 A1* | 10/2008 | Mellert | G01L 19/00 73/712 |
| 2009/0082986 A1* | 3/2009 | Pettersson | G01B 21/042 702/95 |
| 2010/0125425 A1* | 5/2010 | Jacob | G01L 9/0075 702/50 |
| 2011/0094305 A1* | 4/2011 | Adam | G01L 19/0645 73/708 |
| 2011/0247424 A1* | 10/2011 | Mayr | G01L 19/086 73/722 |
| 2012/0006119 A1* | 1/2012 | Broden | G01L 13/026 73/716 |
| 2013/0306161 A1* | 11/2013 | Zhao | B60N 2/665 137/14 |
| 2013/0317772 A1 | 11/2013 | Dawson | |
| 2013/0333440 A1* | 12/2013 | Hedtke | G01L 27/007 73/717 |
| 2016/0320256 A1* | 11/2016 | Burgard | G01L 9/12 |
| 2017/0023428 A1* | 1/2017 | Chen | G01L 9/0052 |
| 2018/0058893 A1* | 3/2018 | Drahm | G01F 1/8413 |

FOREIGN PATENT DOCUMENTS

| | | |
|---|---|---|
| CN | 101410703 A | 4/2009 |
| CN | 105899924 A | 8/2016 |
| CN | 105917204 A | 8/2016 |
| DE | 19547281 A1 | 7/1996 |
| DE | 19732546 C1 | 12/1998 |
| DE | 102004054644 A1 | 5/2006 |
| DE | 102004056106 A1 | 5/2006 |
| DE | 102007014898 A1 | 10/2008 |
| EP | 1302755 A1 | 4/2003 |
| EP | 2149715 B1 | 6/2017 |

* cited by examiner

METHOD FOR PROVIDING CALIBRATED PRESSURE TRANSDUCERS

CROSS-REFERENCE TO RELATED APPLICATIONS

The present application is related to and claims the priority benefit of German Patent Application No. 10 2017 131 066.5, filed on Dec. 22, 2017 and International Patent Application No. PCT/EP2018/081288, filed on Nov. 15, 2018 the entire contents of which are incorporated herein by reference.

TECHNICAL FIELD

The present invention relates to a method for providing calibrated pressure measuring transmitters.

BACKGROUND

Pressure measuring transmitters have a sensor module, a process connection and an electronics module coupled with the process connection; wherein the sensor module has a sensor module housing, a measuring circuit, a pressure sensor having a deformation body, especially in the form of a measuring membrane, and a measuring transducer for providing a first analog, primary signal, and a second analog, primary signal, wherein the measuring transducer is functionally connected with the deformation body, wherein the pressure sensor and the measuring circuit are arranged in the housing; wherein the deformation body is contactable by a pressure, wherein the first primary signal S1 has a first dependence on a pressure dependent deformation of the deformation body and a temperature of the pressure sensor, wherein the second primary signal S2 has a second dependence on the pressure dependent deformation of the deformation body and the temperature of the pressure sensor, which differs from the first dependence, wherein the measuring circuit is adapted, as a function of the first primary signal S1 and the second primary signal S2, to ascertain a sensor measured value pS(S1, S2) and to provide such to a sensor module interface; wherein the electronics module has an electronics housing and a signaling circuit, which is arranged in the electronics housing, an electronics module interface for receiving the sensor measured value pS from the sensor module interface and a signaling interface for outputting a measured value signal SM(pS) as a function of the received sensor measured value. Such pressure measuring transmitters are obtainable, for example, from Endress+Hauser under the marks, Cerabar, Deltabar, and Deltapilot.

The modular construction of the pressure measuring transmitters offers the opportunity to provide suitable combinations of sensor modules and electronics modules for different measuring tasks and locations of use, wherein most pressure measuring transmitters are adapted to output an analog measured value signal, especially an electrical current signal between 4 and 20 mA. As proof of the accuracy of measurement, a calibration protocol is required, which associates defined pressure values $p_i$, which were supplied to the sensor module during calibration, with measured value signals output by the electronics module.

Insofar as the production and compensation of sensor modules, on the one hand, and the production of electronics modules, on the other hand, occur separately, and the combining of an electronics module with a sensor module in a final assembly is an additional, independent procedure, the calibrating of the pressure measuring transmitter, which documents a measured relationship between applied pressure values and actually output, measured value signals, requires a large logistical effort.

SUMMARY

It is, therefore, an object of the present invention to provide a remedy for this situation. The object is achieved according to the invention by the method as defined in independent claim 1.

The method of the invention serves for providing calibrated pressure measuring transmitters, wherein a pressure measuring transmitter for practicing the method of the invention has a sensor module, a process connection and an electronics module coupled with the process connection; wherein the sensor module has a sensor module housing, a measuring circuit, a pressure sensor having a deformation body, especially in the form of a measuring membrane, and a measuring transducer for providing a first analog, primary signal, and a second analog, primary signal, wherein the measuring transducer is functionally connected with the deformation body, wherein the pressure sensor and the measuring circuit are arranged in the housing; wherein the deformation body is contactable by a pressure, wherein the first primary signal S1 has a first dependence on a pressure dependent deformation of the deformation body and a temperature of the pressure sensor, wherein the second primary signal S2 has a second dependence on the pressure dependent deformation of the deformation body and the temperature of the pressure sensor, which differs from the first dependence, wherein the measuring circuit is adapted, as a function of the first primary signal S1 and the second primary signal S2, to ascertain a sensor measured value pS(S1, S2) and to provide such to a sensor module interface; wherein the electronics module has an electronics housing and a signaling circuit, which is arranged in the electronics housing, an electronics module interface for receiving the sensor measured value pS from the sensor module interface and a signaling interface for outputting a measured value signal SM(pS) as a function of the received sensor measured value;

wherein the method comprises:

calibrating the sensor module, wherein the calibrating of the sensor module comprises:

supplying the sensor module with a plurality of defined pressure values $p_i$ and registering sensor measured values $pS(p_i)$ output from the sensor module; and storing sensor calibration data, wherein the sensor calibration data comprise pressure values $p_i$ for the calibrating and associated sensor measured values $pS(p_i)$;

separate calibrating of an electronics module associated with the sensor module, wherein the calibrating of the electronics module comprises:

connecting an interface of the electronics module with a calibration signal source, wherein the interface of the electronics module can be, for example, a manufacturing interface or the electronics module interface;

outputting the registered sensor measured values pS of the sensor calibration data to the electronics module interface by means of the calibration signal source;

registering measured value signals SM(pS), especially at room temperature, on the signaling interface; and creating a calibration protocol, which associates the measured value signals registered in the calibrating of the electronics module with the defined pressure values $p_i$, with which the sensor module was supplied in the sensor calibration.

In a further development of the invention, the sensor measured value is output as a digital signal on the sensor module interface.

In a further development of the invention, the measured value signal is an electrical current signal, especially a 4 . . . 20 mA electrical current signal.

In a further development of the invention, the method further includes connecting the electronics module with the sensor module, especially connecting the sensor module interface with the electronics module interface and/or mounting the electronics housing on the sensor module housing.

In a further development of the invention, the method further includes compensating the sensor module, wherein the compensating occurs before the calibrating of the sensor module.

In a further development of the invention, the method further includes mounting a process connection; and readjusting the sensor module;

wherein the mounting of a process connection and the readjusting occurs between the compensating and the calibrating of the sensor module.

In a further development of the invention, the compensating of the sensor module includes:

introducing the sensor module into a compensation device;

supplying at least one sensor module with a plurality of pressure values $p_i$ at a plurality of temperatures $T_j$;

registering associated first and second primary signals $S1(p_i, T_j)$ and $S2(p_i, T_j)$;

ascertaining a transducer transfer function $W(S1, S2)$ based on the registered signals for calculating sensor measured values;

$$pS(S1,S2)=W(S1(p,T),S2(p,T))$$

so that for all i, j the sensor measured value $pS(S1(p_i, T_j), S2(p_i, T_j))$ corresponds within a predetermined tolerance value dp1 to a predetermined linear sensor transfer function $S(p)$ of the pressure p, with which the pressure sensor was supplied, wherein $S(p)=a_s*p+S_0$;

implementing the ascertained transducer transfer function $W(S1, S2)$ in the measuring circuit; and removing the sensor module from the compensation device.

In a further development of the invention, readjusting the sensor module includes:

mounting the sensor module by means of the process connection on a sensor module calibration station;

supplying the sensor module with at least two pressure values $p_i$, registering associated sensor measured values $pS(p_i)$; and ascertaining and implementing a readjusted transducer transfer function $W(S1, S2)$, or $W(S1, S2, ST)$ in the measuring circuit so that the sensor measured values $pS(p_i)$ for the at least two pressure measurement values $p_i$ correspond within a tolerance value dp2 to the predetermined sensor transfer function $S(p)=a_s*p+S_0$.

In a further development of the invention, the calibrating of the sensor module in the sensor module calibration station occurs by renewed supplying of the sensor module with at least two pressure values $p_i$;

registering associated sensor measured values $pS(p_i)$; and;

storing the calibration data with value pairs $p_i$, $pS(p_i)$ in a data memory.

In a further development of the invention, the pressure sensor module is compensated and/or calibrated in at least two defined measuring ranges.

wherein a first measuring range differs from a second measuring range as regards the measuring range, and/or wherein the average pressure difference between the pressure values used for calibrating the sensor module in the first measuring range differs from the average pressure difference between the pressure values used for calibrating the sensor module in the second measuring range.

BRIEF DESCRIPTION OF THE DRAWINGS

The invention will now be explained in greater detail based on the example of an embodiment shown in the drawing, the figures of which show as follows.

DETAILED DESCRIPTION

Figure 1:
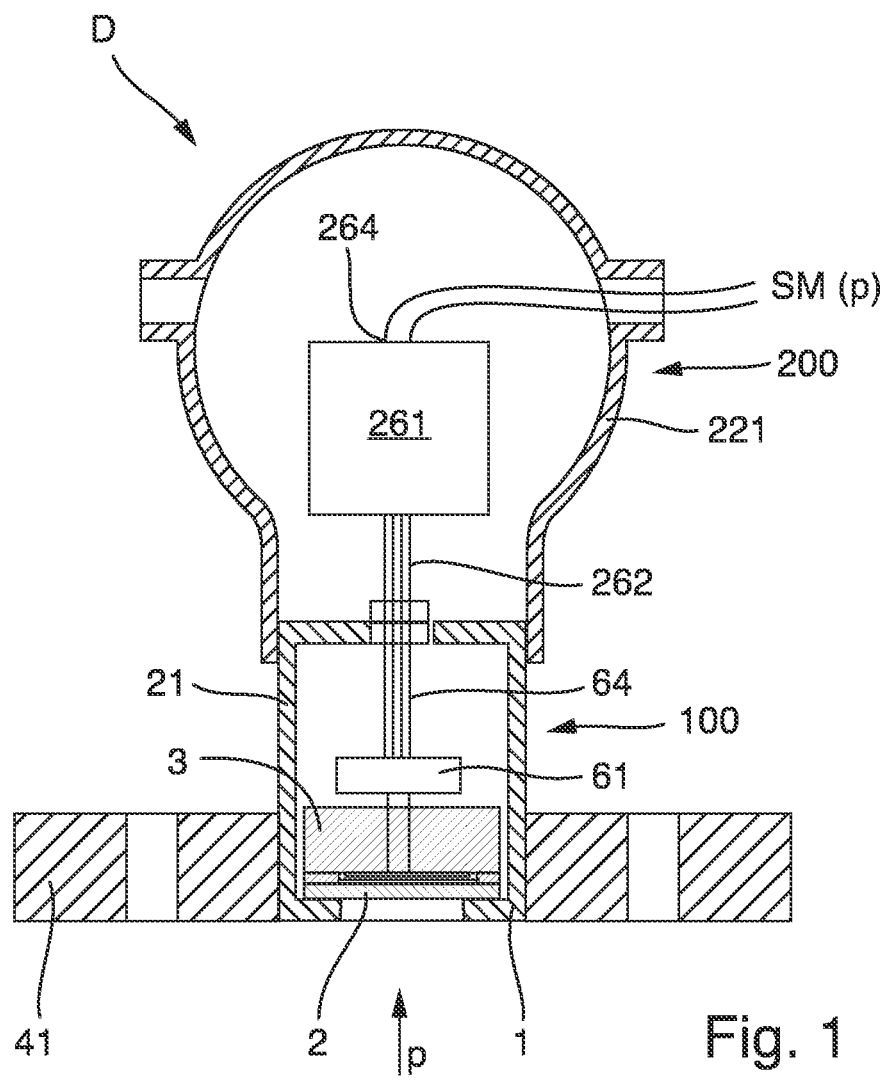
FIG. 1 shows a schematic view of an example of an embodiment of a pressure measuring transmitter provided by means of the method of the present disclosure.

The pressure measuring transmitter D shown in FIG. 1 includes a pressure sensor module 100 and an electronics module 200, which is mounted on the pressure sensor module.

Figure 2:
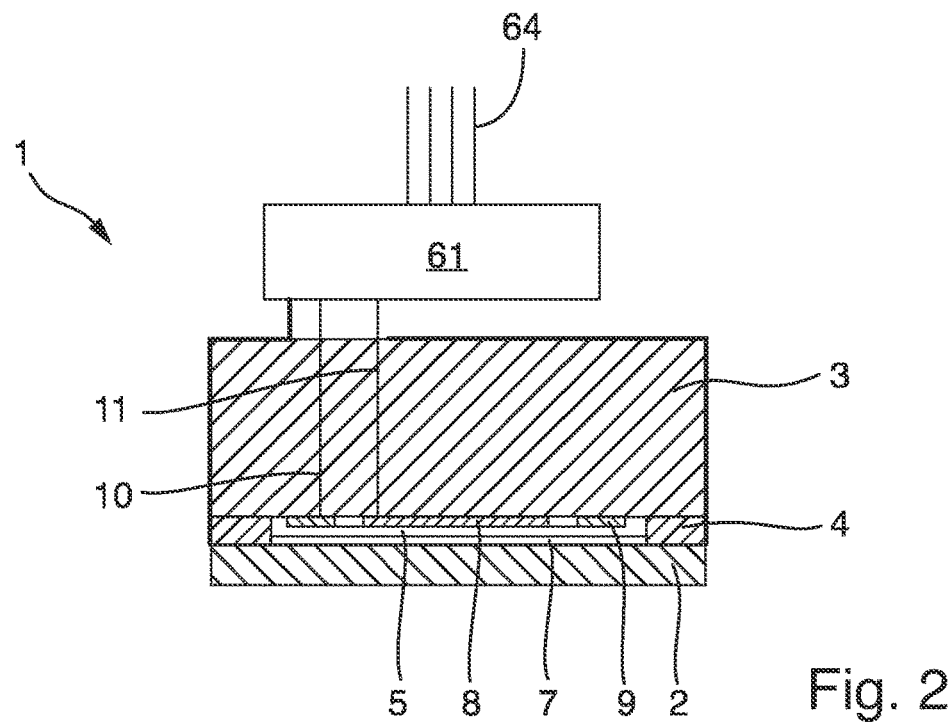
FIG. 2 shows a schematic view of an example of an embodiment of a pressure sensor of a pressure measuring transmitter provided by means of the method of the present disclosure.

The pressure sensor module 100 includes a pressure sensor 1, a housing 21, a process connection 41 and a measuring circuit 61. The pressure sensor 1 includes, such as shown in greater detail in FIG. 2, a deformation body in the form of a circular disc shaped, ceramic measuring membrane 2, which is pressure tightly joined with a significantly stiffer, circularly plate shaped, ceramic platform 3 along a peripheral joint 4 to form a measurement chamber 5 between the platform 3 and the measuring membrane 2. The pressure sensor includes a capacitive measuring transducer with two capacitors, which output two primary signals S1, S2 determined by the pressure- and temperature dependent capacitances. For this, the measuring membrane 2 includes on its platform facing surface a full surface membrane electrode 7, which comprises, for example, a metal layer. Arranged on the measuring membrane facing surface of the platform is a central, circular disc shaped measuring electrode 8, which is surrounded by a circularly shaped reference electrode 9 of, relative to the membrane electrode 7 in the rest position of the measuring membrane 2, essentially equal capacitance. The reference electrode 9 and the measuring electrode 8 are connected via metal feedthroughs 10, 11 through the platform with the measuring circuit 61. The membrane electrode 7 can be connected, for example, via the joint, with circuit ground.

Measuring circuit 61 drives the electrodes and processes their signals. A first of the primary signals S1 represents a measured capacitance $c_p$ between the measuring electrode 8 and the membrane electrode 7, while a second of the primary signals S2 represents a reference capacitance $c_r$ between the reference electrode 8 and the membrane electrode 7.

The primary signals enter, for example, in the form of auxiliary variables $H1=(S1-S2)/S1$ and $H2=S2$ as arguments into a transfer function $W(S1,S2)$, such that $W(S1, S2):=V(H1,H2)$, wherein the auxiliary transfer function V(H1, H2) is especially a polynomial in H1 and H2. In given cases, the transfer function W(S1, S2) and the auxiliary transfer function also have temperature dependent terms, which depend on the signal of an additional temperature sensor, which registers a temperature of the platform. By means of the transfer function, the measuring circuit 61 calculates a digital sensor measured value pS for output on a sensor module interface 64.

In the case of compensating the pressure sensor, the pressure sensor is supplied with a field of pressure values over a measuring range defined for the pressure sensor at two or more temperatures in a temperature use range defined for the pressure sensor, in order, for example, to determine coefficients for the function V(H1,H2), so that for all pressure values $p_i$ the calculated sensor measured value $pS(p_i)=W(S1(p_i, T_i), S2(p_i, T_i))$, or $pS(p_i)=V(H1(p_i, T_j), H2(p_i, T_i))$, corresponds, within a predetermined tolerance value, to the supplied pressure value $p_i$. Depending on number of coefficients in the functions, this can require, for example, five to ten pressure values at, in each case, three to five different temperatures. The ascertained coefficients are stored in a memory of the measuring circuit, in order, thus, to implement the ascertained transfer function.

Advantageously, a plurality of sensor modules (100) are synchronously compensated in a compensation plant, which can have a comparatively compact construction, since only the sensor modules without electronics module and preferably also without process connection are compensated.

In a later manufacturing step, there can be applied to a sensor module 100 a process connection 41, which is embodied, for example, as a flange and connected with the housing 21 by a facial weld seam as shown in FIG. 1. The welding should, indeed, occur with little disturbance. However, to achieve that completely without effects on the transfer function is scarcely possible. When these effects should be corrected, a two point measurement at room temperature, for example, at the zero-point and at a predetermined upper measuring range limit, is sufficient, in order then, for example, to ascertain a corrected constant and a corrected coefficient of a linear term in H1, with which the implemented transfer function can be readjusted. For this, the pressure sensor module is supplied in a calibration station with the two pressure values, and the deviations of the sensor measured values $pS(p_i)$ from the $p_i$ registered.

Advantageously, performed directly following the implementing of the readjusted transfer function is a calibrating, for which the pressure sensor module is supplied with a plurality of pressure values $p_i$, and the associated sensor measured values $pS(p_i)$ registered in a calibration database. As a result, the actually achieved accuracy of measuring of a first part of a signal path is documented by the measuring transmitter.

The pressure sensor module was described above with a pressure sensor with capacitive transducer. Fundamentally, any other transducer principles can be used, for example, a (piezo-)resistive transducer, especially in the form of a full bridge circuit, in the case of which the diagonal voltage forms an, in first approximation, pressure proportional, first signal S1 and the longitudinal voltage an essentially temperature dependent, second signal S2. The type of transducer does not change the feature that, after the calibrating of the sensor module, a calibration data record $pS(p_i)$ is provided.

An electronics module serves in the case of field devices of process measurements technology essentially for signaling the sensor measured values in a format, which is used in the particular process plant.

For this, an electronics module 200 includes a housing 221 and a communication circuit 261, which is arranged in the housing. The communication circuit 261 of the operationally ready pressure measuring transmitter is connected by means of an electronics module interface 262 to a sensor module interface 64 of the sensor module 100, in order to ascertain as a function of the sensor measured value pS a measured value signal SM(pS) and to output such on its signaling interface 264. Especially, the communication circuit is adapted, firstly, to calculate an electrical current value representing the sensor measured value, and then to set a direct current signal, which corresponds to the calculated electrical current value, for example, in the value range 4 . . . 20 mA.

In order, according to the invention, to check and to document that a total transfer function of the pressure measuring transmitter leads to correct measured value signals, a second part of the signal path, which is implemented by the communication circuit, is performed independently of the sensor module, however, with the sensor measured value $pS(p_i)$ ascertained in the calibrating of the sensor module. For this, the electronics module interface is connected to a calibration signal source, via which the communication circuit is supplied with the sensor measured value $pS(p_i)$ registered in the calibrating of the sensor module. The measured value signals $SM(pS(p_i))$ output on the communication interface 264 are registered and recorded as value pairs $SM(p_i)$, $p_i$ in a calibration protocol.

As a result, the accuracy of measurement of the complete signal path is documented, without requiring that the complete signal path ever had to be universally tested. This means a great logistical simplification and cost reduction in the providing of calibrated measuring transmitters, without having to enter into any compromises relative to the validity of the calibrating.

Figure 3:
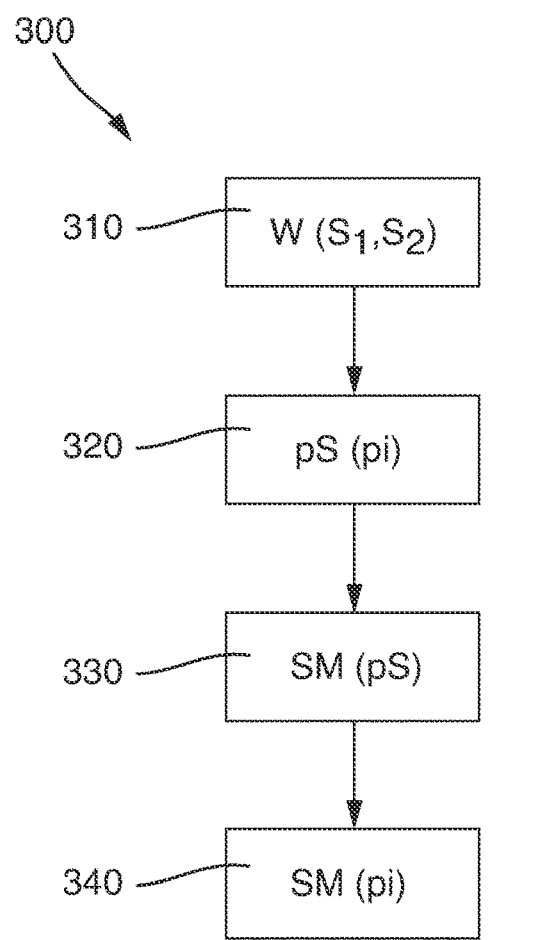
FIG. 3 shows a flow diagram of an example of an embodiment of the method of the present disclosure.

The course of a form of embodiment of the method of the invention will again be briefly summarized based on FIG. 3.

First, the compensating 310 of the sensor module occurs with the implementing of the transfer function W(S1, S2) in the measuring circuit of the sensor module. The transfer function W(S1, S2) generates sensor measured values pS as a function of primary signals S1,S2.

In a later sensor calibration 320, sensor measured values $pS(p_i)$ provided on the sensor module interface as a function of supplied pressure values $p_i$ are registered and stored in a calibration database.

In a later electronics module calibration 330, measured value signals SM(pS) provided on the signaling interface are registered as a function of sensor measured values pS supplied by means of a calibration signal source and stored in a calibration database, wherein the supplied sensor measured values correspond to the $pS(p_i)$ of the sensor calibration.

Finally there follows the calibration protocol creation (340), in which the measured value signals $SM(pS(p_i))$ ascertained in the electronics module calibration (330) are associated with the pressure values $p_i$ supplied in the sensor calibration.

The invention claimed is:

1. A method for providing calibrated pressure measuring transmitters,
   wherein a pressure measuring transmitter has a sensor module, a process connection and an electronics module coupled with the sensor module;
   wherein the sensor module has a sensor module housing, a measuring circuit, a pressure sensor having a deformation body and a measuring transducer for providing a first analog, primary signal, and a second analog, primary signal, wherein the measuring transducer is functionally connected with the deformation body, wherein the pressure sensor and the measuring circuit are arranged in the housing;

wherein the deformation body is contactable by a pressure, wherein the first primary signal has a first dependence on a pressure dependent deformation of the deformation body and a temperature of the pressure sensor, wherein the second primary signal has a second dependence on the pressure dependent deformation of the deformation body and the temperature of the pressure sensor, which differs from the first dependence, wherein each pressure applied to the deformation body is selected from a plurality of different pressures for each of a plurality of different signals;

wherein the measuring circuit is adapted, as a function of the first primary signal and the second primary signal, to ascertain a sensor measured value and to provide such to a sensor module interface;

wherein the electronics module has an electronics housing and a signaling circuit, which is arranged in the electronics housing, an electronics module interface for receiving the sensor measured value from the sensor module interface and a signaling interface for outputting a measured value signal as a function of the received sensor measured value;

wherein the method comprises:

calibrating the sensor module independently from the electronics module, wherein the calibrating of the sensor module comprises: supplying the sensor module with a plurality of defined pressure values and registering sensor measured values output from the sensor module; and storing sensor calibration data, wherein the sensor calibration data comprise pressure values $p_i$ for the calibrating and associated sensor measured values;

separate calibrating of an electronics module associated with the sensor module, wherein the calibrating of the electronics module comprises: connecting an interface of the electronics module with a calibration signal source; outputting the registered sensor measured values of the sensor calibration data to the electronics module interface by means of the calibration signal source; registering measured value signals on the signaling interface; and creating a calibration protocol, which associates the measured value signals registered in the calibrating of the electronics module with the defined pressure values, with which the sensor module was supplied in the sensor calibration.

2. The method of claim 1, wherein the sensor measured value is output as a digital signal on the sensor module interface.

3. The method of claim 1, wherein the measured value signal is an electrical current signal.

4. The method of claim 1, further including: connecting the electronics module with the sensor module.

5. The method of claim 1, further comprising:
compensating the sensor module, wherein the compensating occurs before the calibrating of the sensor module.

6. The method of claim 5, further comprising:
mounting a process connection; and
readjusting the sensor module;
wherein the mounting of the process connection and the readjusting occurs between the compensating and the calibrating of the sensor module.

7. The method of claim as claimed in claim 6, wherein the compensating of the sensor module includes:
introducing the sensor module into a compensation device;
supplying at least one sensor module with a plurality of pressure values at a plurality of temperatures;
registering associated first and second primary signals;
ascertaining a transducer transfer function based on the registered signals for calculating sensor measured values so that each of the sensor measured values correspond within a predetermined tolerance value to a predetermined linear sensor transfer function of the pressure p, with which the pressure sensor was supplied;
implementing the ascertained transducer transfer function in the measuring circuit; and
removing the sensor module from the compensation device.

8. The method of claim 7, wherein readjusting the sensor module includes:
mounting the sensor module by means of the process connection on a sensor module calibration station;
supplying the sensor module with at least two pressure values, registering associated sensor measured values; and
ascertaining and implementing a readjusted transducer transfer function in the measuring circuit so that the sensor measured values for the at least two pressure measurement values correspond within a tolerance value to the predetermined sensor transfer function.

9. The method of claim 8, wherein the calibrating of the sensor module in the sensor module calibration station occurs by:
renewed supplying of the sensor module with at least two pressure values;
registering associated sensor measured values; and
storing the calibration data with value pairs in a data memory.

10. The method of claim 1, wherein the pressure sensor module is compensated or calibrated in at least two defined measuring ranges; wherein a first measuring range differs from a second measuring range as regards the measuring range, or wherein the average pressure difference between the pressure values used for calibrating the sensor module in the first measuring range differs from the average pressure difference between the pressure values used for calibrating the sensor module in the second measuring range.

* * * * *